US011890822B2

(12) United States Patent
Fromonteil et al.

(10) Patent No.: US 11,890,822 B2
(45) Date of Patent: Feb. 6, 2024

(54) COMPONENT OF REVOLUTION MADE OF COMPOSITE MATERIAL HAVING IMPROVED RESISTANCE TO DELAMINATION

(71) Applicant: SAFRAN AIRCRAFT ENGINES, Paris (FR)

(72) Inventors: Didier Fromonteil, Moissy-Cramayel (FR); Laurent Jean Baptiste Baroumes, Moissy-Cramayel (FR); Hervé Grelin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 57 days.

(21) Appl. No.: 17/622,033

(22) PCT Filed: Jun. 18, 2020

(86) PCT No.: PCT/FR2020/051059
§ 371 (c)(1),
(2) Date: Dec. 22, 2021

(87) PCT Pub. No.: WO2020/260804
PCT Pub. Date: Dec. 30, 2020

(65) Prior Publication Data
US 2022/0250338 A1    Aug. 11, 2022

(30) Foreign Application Priority Data

Jun. 27, 2019    (FR) ...................................... 1907019

(51) Int. Cl.
*B29C 70/30*    (2006.01)
*B32B 5/26*    (2006.01)
(Continued)

(52) U.S. Cl.
CPC .............. *B29C 70/30* (2013.01); *B32B 3/085* (2013.01); *B32B 5/024* (2013.01); *B32B 5/263* (2021.05);
(Continued)

(58) Field of Classification Search
CPC .......... F01D 5/282; F01D 5/28; F01D 25/003; F01D 25/00; C08K 3/041; C08K 3/04;
(Continued)

(56) References Cited

U.S. PATENT DOCUMENTS 8,322,971 B2    12/2012    Coupe et al.
2007/0128960 A1    6/2007    Ghasemi et al.
(Continued)

OTHER PUBLICATIONS

International Search Report as issued in International Patent Application No. PCT/FR2020/051059, dated Dec. 3, 2020.

*Primary Examiner* — Camie S Thompson
(74) *Attorney, Agent, or Firm* — Pillsbury Winthrop Shaw Pittman LLP

(57) ABSTRACT

A process for manufacturing a cylindrical composite component comprises includes producing a fibrous texture in the form of a strip by three-dimensional or multi-layer weaving, winding the fibrous texture on several superimposed lathes on a mandrel with a profile corresponding to that of the component to be manufactured so as to form a fibrous preform, densifying the fibrous preform by a matrix. When the fibrous texture is wound on the mandrel, a web including a fugitive material filled with carbon nanotubes is interposed between the adjacent turns of the fibrous texture.

5 Claims, 6 Drawing Sheets

(51) Int. Cl.
  *B32B 3/08* (2006.01)
  *B32B 5/02* (2006.01)
  *D03D 1/00* (2006.01)
  *D03D 25/00* (2006.01)
  *F02C 7/00* (2006.01)
  *B29L 31/00* (2006.01)

(52) U.S. Cl.
  CPC ............. *D03D 1/00* (2013.01); *D03D 25/005* (2013.01); *F02C 7/00* (2013.01); *B29L 2031/7504* (2013.01); *B32B 2250/20* (2013.01); *B32B 2255/02* (2013.01); *B32B 2260/023* (2013.01); *B32B 2260/046* (2013.01); *B32B 2262/0269* (2013.01); *B32B 2262/101* (2013.01); *B32B 2262/105* (2013.01); *B32B 2262/106* (2013.01); *B32B 2605/18* (2013.01); *F05D 2220/32* (2013.01); *F05D 2300/603* (2013.01); *F05D 2300/6012* (2013.01); *F05D 2300/614* (2013.01)

(58) Field of Classification Search
  CPC ..... B32B 27/34; B32B 5/02; F05D 2300/603; D02G 3/02; D02G 3/22; B82Y 30/00; D03D 15/00; D04H 13/00
  USPC ........ 156/60, 285, 286; 415/9, 173.1, 173.4; 139/22, 383 R, 384 R, 388, 408; 428/338, 401, 292.1, 296.4, 297.1, 297.4, 428/299.1, 299.7; 977/742, 746; 442/189, 335
  See application file for complete search history.

(56) References Cited

U.S. PATENT DOCUMENTS

2012/0164903 A1\* 6/2012 Wardle ................. B32B 5/28
  428/338
2019/0153876 A1 5/2019 Gemeinhardt et al.

\* cited by examiner

[Fig. 1]
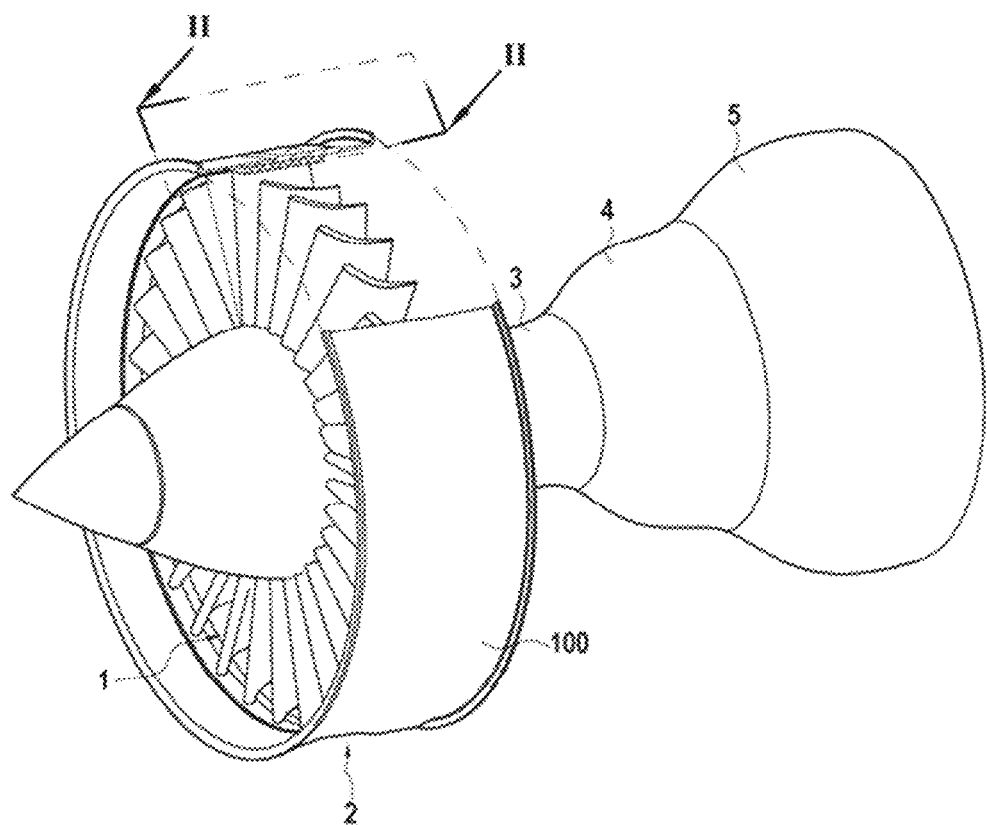

[Fig. 2]
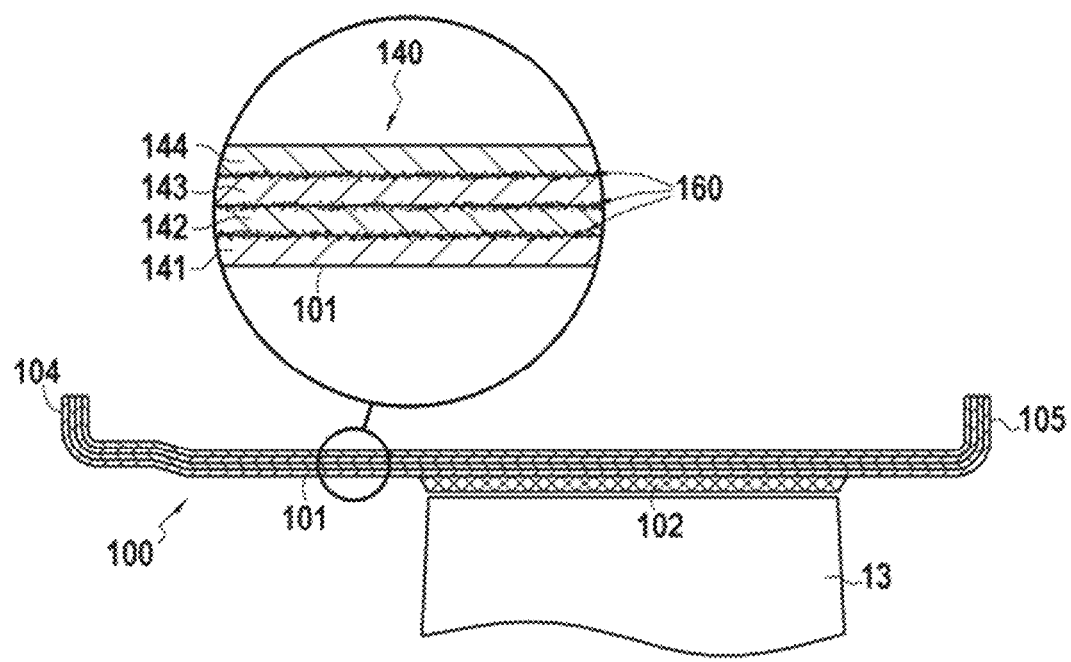

[Fig. 3]
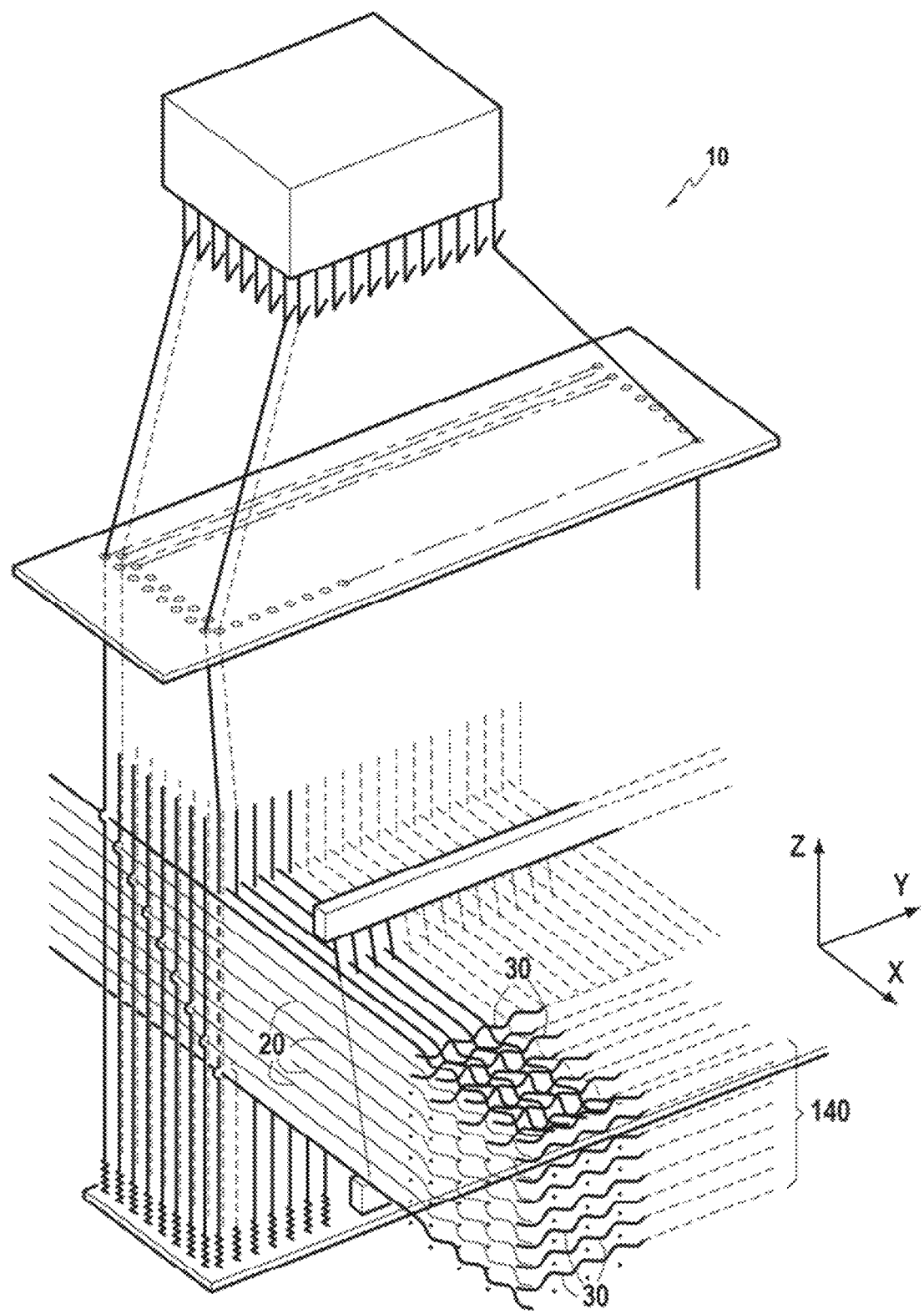

[Fig. 4]
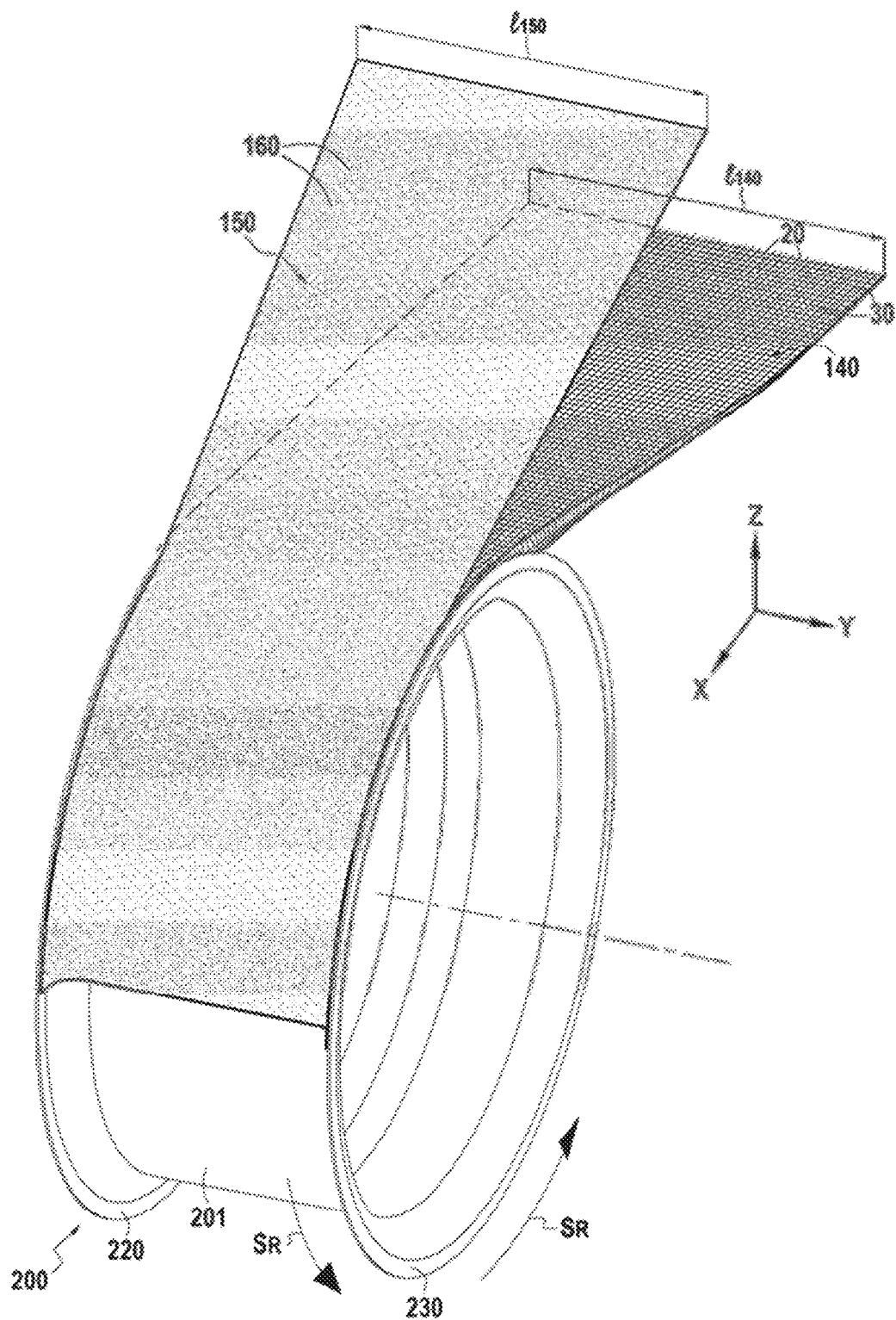

[Fig. 5]
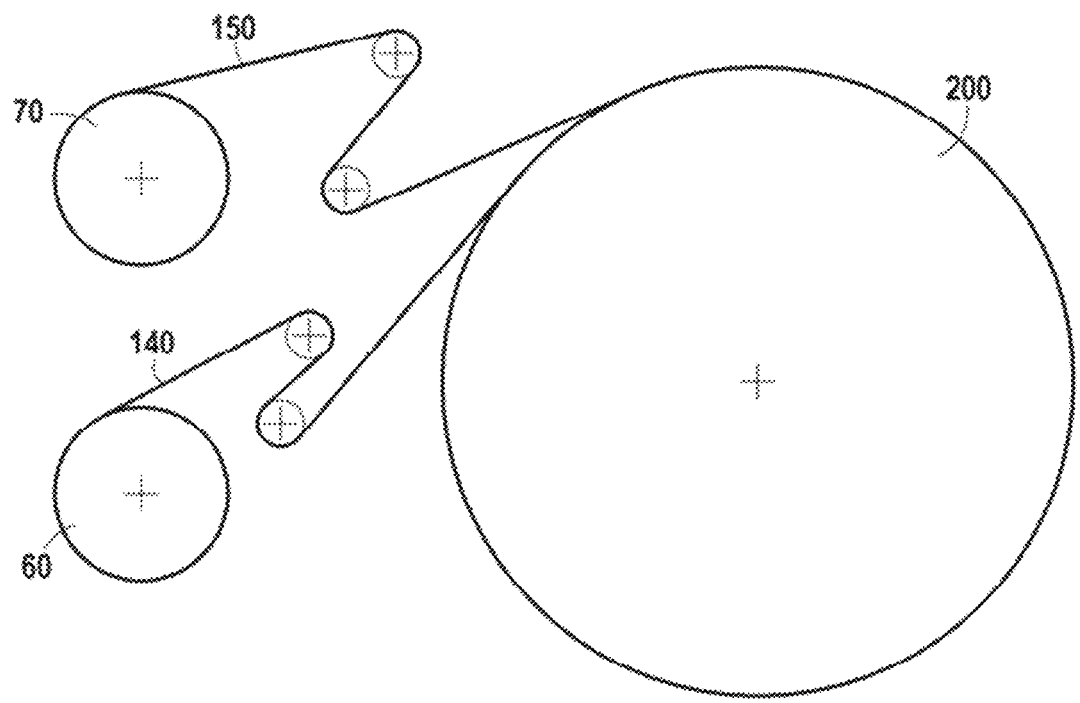
[Fig. 6]
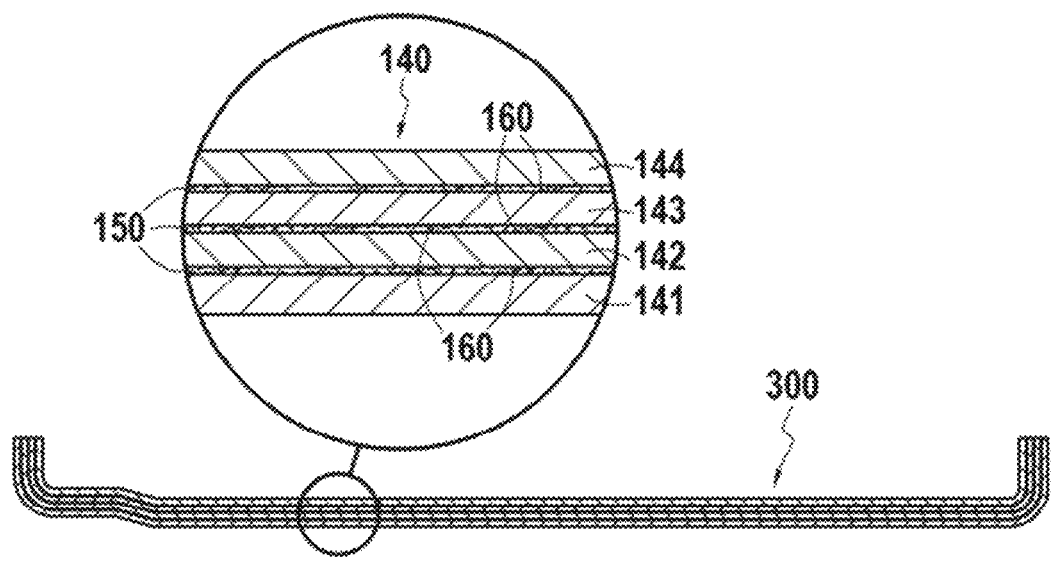

[Fig. 7]
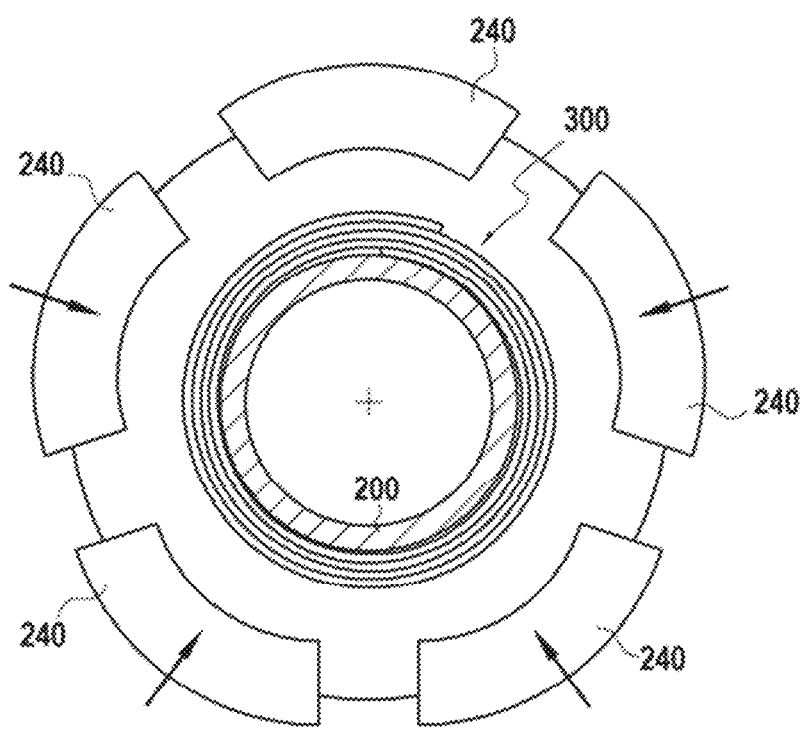

COMPONENT OF REVOLUTION MADE OF COMPOSITE MATERIAL HAVING IMPROVED RESISTANCE TO DELAMINATION

CROSS-REFERENCE TO RELATED APPLICATIONS

This application is the U.S. National Stage of PCT/FR2020/051059, filed Jun. 18, 2020, which in turn claims priority to French patent application number 1907019 filed Jun. 27, 2019. The content of these applications are incorporated herein by reference in their entireties.

TECHNICAL FIELD

The present invention relates to the general field of manufacturing cylindrical components such as gas turbine casings.

PRIOR ART

In the field of aeronautics, the aim is to reduce the weight of engine components while maintaining their mechanical properties at a high level. For example, in an aeronautical turbomachine, the fan casing defining the contour of the engine's air intake duct and inside which the rotor supporting the fan blades is housed is now made of composite material.

The manufacture of a composite fan casing begins by winding a fibrous reinforcement on a mandrel whose profile matches that of the casing to be produced. The fibrous reinforcement can be made, for example, by three-dimensional (3D) or multi-layer weaving as described in patent U.S. Pat. No. 8,322,971. This fibrous reinforcement constitutes a tubular fibrous preform forming a single piece with flanges corresponding to the flanges of the casing. The manufacturing process continues with densifying the fibrous preform with a polymer matrix which consists in impregnating the preform with a resin and polymerizing the latter to obtain the final component.

Three-dimensional or multi-layer weaving makes it possible to produce fibrous reinforcements with very good mechanical resistance, in particular to delamination. On the other hand, in the case of a fibrous reinforcement obtained by winding a 3D or multi-layer woven web, the fibrous reinforcement presents a weakness at the interface between the adjacent winding turns because there is no Z-direction bond in this zone. Consequently, there is a need to improve the delamination resistance of cylindrical composite components.

DISCLOSURE OF THE INVENTION

To this end, according to the invention, a process is proposed for manufacturing a cylindrical composite component comprising:
  producing a fibrous texture in the form of a strip by three-dimensional or multi-layer weaving,
  winding the fibrous texture on several superimposed lathes on a mandrel with a profile corresponding to that of the component to be manufactured so as to form a fibrous preform,
  densifying the fibrous preform with a matrix,
  characterized in that, when the fibrous texture is wound on the mandrel, a web comprising a fugitive material filled with carbon nanotubes is interposed between the adjacent turns of the fibrous texture.

By interposing a web of fugitive material filled with carbon nanotubes between adjacent turns of the fibrous texture, it is possible to strengthen the bond between adjacent turns without resorting to sewing or needling, for example. Indeed, after the composite component has been manufactured, carbon nanotubes are present at the interfaces between the adjacent turns of the fibrous reinforcement of the component, which increases the delamination resistance of the reinforcement in these zones.

According to a feature of the process of the invention, densifying the fibrous preform comprises impregnating the preform with a resin and converting the resin into a matrix by heat treatment, the web comprising a fugitive material filled with carbon nanotubes being a layer of a fusible material filled with carbon nanotubes, the fusible material having a melting temperature lower than the treatment temperature of the resin. The fusible material can thus be removed during the temperature rise for the resin-matrix treatment and thereby release the carbon nanotubes which will mix with the resin present at the interfaces between the adjacent turns of fibrous texture. The fusible material can be a thermoplastic having a melting temperature below 150° C.

According to another feature of the process of the invention, the carbon nanotubes are multi-walled carbon nanotubes having substantially a diameter of 10 nm and a length of 2 µm and/or single-walled carbon nanotubes having substantially a diameter of 2 nm and a length of 5 µm.

The invention also relates to a cylindrical composite component having a fibrous reinforcement comprising a plurality of superimposed turns of a fibrous texture in the form of a strip with a three-dimensional weave, said fibrous reinforcement being densified by a matrix, characterized in that a layer comprising carbon nanotubes is interposed between the adjacent turns of the fibrous texture.

According to a feature of the component of the invention, the carbon nanotubes are multi-walled carbon nanotubes having substantially a diameter of 10 nm and a length of 2 µm and/or single-walled carbon nanotubes having substantially a diameter of 2 nm and a length of 5 µm.

The invention also relates to an aeronautical gas turbine engine having a composite component according to the invention.

The invention further relates to an aircraft comprising one or more engines according to the invention.

BRIEF DESCRIPTION OF THE DRAWINGS

FIG. 1 is a perspective and partial cross-sectional view of an aeronautical engine equipped with a composite fan casing according to an embodiment of the invention, FIG. 2 is a cross-sectional view along the plane of the casing of FIG. 1, FIG. 3 is a schematic perspective view of a loom showing the weaving of a fibrous texture used to form the fibrous reinforcement of the casing of FIGS. 1 and 2, FIG. 4 is a perspective view showing the shaping of a fibrous texture and a web of thermoplastic filled with carbon nanotubes to form the reinforcement of the fan casing of FIGS. 1 and 2, FIG. 5 is a schematic view showing the simultaneous winding of the fibrous structure and the thermoplastic web filled with carbon nanotubes of FIG. 4, FIG. 6 is a cross-sectional view showing the profile of the fibrous preform obtained after winding the fibrous structure and the thermoplastic web filled with carbon nanotubes of FIGS. 4 and 5, FIG. 7 is a schematic view showing a tooling for densifying the fibrous preform of FIG. 6 with a matrix.

DESCRIPTION OF THE EMBODIMENTS

The invention generally applies to any cylindrical composite component whose reinforcement is formed from a 3D-woven strip wound over several turns.

The invention will be described below in the context of its application to an aeronautical gas turbine engine fan casing.

Such an engine, as shown very schematically in FIG. 1, comprises, from upstream to downstream in the direction of the gas flow, a fan 1 arranged at the inlet of the engine, a compressor 2, a combustion chamber 3, a high-pressure turbine 4 and a low-pressure turbine 5.

The engine is housed within a casing comprising several parts corresponding to different elements of the engine. Thus, the fan 1 is surrounded by a fan casing 100.

FIG. 2 shows a profile of a composite fan casing 100 as it may be obtained by a process according to the invention. The inner surface 101 of the casing defines the air inlet duct. It may be provided with a layer of abradable coating 102 in line with the path of the fan blade tips, a blade 13 being partially shown in a very schematic manner. The abradable coating is thus disposed along only a portion of the length (in the axial direction) of the casing. An acoustic treatment coating (not shown) may further be disposed on the inner surface 101 particularly upstream of the abradable coating 102.

The casing 100 may be provided with external flanges 104, 105 at its upstream and downstream ends to allow it to be mounted and connected to other components.

The casing 100 is made of a composite material with a fibrous reinforcement densified by a matrix. The reinforcement is made of fibers, for example carbon, glass, aramid or ceramic, and the matrix is made of a polymer, for example epoxy, bismaleimide or polyimide, carbon or ceramic.

The fibrous reinforcement is formed by winding on a mandrel a fibrous texture made by three-dimensional weaving with evolving thickness, the mandrel having a profile corresponding to that of the casing to be produced. Advantageously, the fibrous reinforcement constitutes a complete tubular fibrous preform of the casing 100 forming a single piece with reinforcing portions corresponding to the flanges 104, 105.

In accordance with the invention, the fibrous reinforcement of the casing 100 consists of a plurality of superimposed turns 141 to 144 of a fibrous texture 140 in the form of a strip having a three-dimensional or multi-layer weave (in FIG. 2, the turns 141 to 144 are densified by a matrix). In addition, a layer of carbon nanotubes 160 is present at the interface between two adjacent turns of the fibrous texture. In the example described here, carbon nanotubes 160 are present at the interface between turns 141 to 144 of the fibrous texture 140.

The bond at the interface between two adjacent turns is thus strengthened by the presence of carbon nanotubes.

A process for manufacturing the fan casing 100 is now explained.

As shown in FIG. 3, a fibrous texture 140 is made in a known manner by weaving using a Jacquard-type loom 10 on which a bundle of warp yarns or strands 20 have been arranged in a plurality of layers, the warp yarns being bound by weft yarns or strands 30. The fibrous texture is made by three-dimensional weaving. "Three-dimensional weaving" or "3D weaving", as used herein, means a mode of weaving whereby at least some of the weft yarns bind warp yarns to a plurality of layers of warp yarns or vice versa. An example of three-dimensional weaving is the so-called "interlock" weave, "Interlock" weave, as used herein, means a weave in which each layer of warp threads interlinks several layers of weft threads with all the threads of the same warp column having the same movement in the weave plane.

As shown in FIGS. 3 and 4, the fibrous texture 140 has a strip shape that extends lengthwise in a direction X corresponding to the direction of travel of the warp yarns or strands 20 and widthwise or transversely in a direction Y corresponding to the direction of the weft yarns or strands 30.

The fibrous structure can be woven from carbon fiber yarns, ceramic such as silicon carbide, glass, or aramid.

As shown in FIG. 4, a fibrous preform is formed by winding the fibrous texture 140 made by three-dimensional weaving onto a mandrel 200 driven in rotation along a direction SR, the mandrel having a profile corresponding to that of the casing to be produced.

In accordance with the invention, a web 150 comprising carbon nanotubes 160 is wound with the fibrous texture 140, the web 150 being positioned above the first turn 141 of the texture 140 wound on the mandrel 200 so as to interpose a turn of web 150 between two adjacent turns of fibrous texture 140. In the example described herein, the web 150 has a width 1150 equal to the width 1140 of the fibrous texture 140. According to an alternative, the web 150 may have a width less than the width of the fibrous texture 140, the web 150 being placed between adjacent turns of the fibrous texture at a position determined according to the reinforcement needs at the interface between the turns.

Advantageously, the fibrous preform constitutes a complete tubular fibrous reinforcement of the casing 100 forming a single piece with a thickening portion corresponding to the retention zone of the casing.

To this end, the mandrel 200 has an outer surface 201 whose profile corresponds to the inner surface of the casing to be produced. As it is wound onto the mandrel 200, the fibrous texture 140 conforms to the profile thereof. The mandrel 200 also comprises two flanges 220 and 230 for forming portions of fibrous preform corresponding to the flanges 104 and 105 of the casing 100.

During the formation of the fibrous preform by winding on the mandrel 200, the fibrous texture 140 and the web 150 filled with carbon nanotubes 160 are called from drums 60 and 70, respectively, on which they are stored as shown in FIG. 5.

FIG. 6 shows a cross-sectional view of the fibrous preform 300 obtained after winding the fibrous texture 140 and the web 150 in several turns on the mandrel 200. The number of turns or coils depends on the desired thickness and the thickness of the fibrous texture. It is preferably at least equal to 2. In the example described here, the preform 300 comprises 4 turns 141 to 144 of fibrous texture 140 and 3 turns 151 to 153 of web 150 interposed between the adjacent turns 141 and 142, 142 and 143, and 143 and 144, respectively.

A fibrous preform 300 is obtained with an interface formed by the interposition of turns 151 to 153 of the web 150 filled with carbon nanotubes 160 between the superposed layers 141 to 144 of the fibrous texture 140.

The web 150 corresponds to a layer of a fugitive material, i.e., one that can be removed during manufacture, filled with carbon nanotubes 160. In the example described, the fugitive material corresponds to a fusible material, the web 150 corresponding to a web of thermoplastic whose melting temperature is lower than the polymerization temperature of the resin intended to form the matrix as described below. For example, the thermoplastic may be a PA6/PA66 co-polyamide having a melting temperature of 106° C. Other thermoplastics having a melting temperature typically between 85° C. and 148° C. may also be used to form the web.

The web, which corresponds to a particular type of non-woven fabric of thermoplastic fibers, can be produced by the known melt-blowing technique, the web being additionally filled with carbon nanotubes.

The web thus produced is in the form of a stratum of interlocking thermoplastic fibers with a diameter of 30 to 70 µm. The advantage of this type of web is the absence of a chemical binder, as the fibers are thermally bonded together. The gram mage of the non-woven fabric is comprised between 15 g/m² and 100 g/m².

The carbon nanotubes used herein can be single-walled carbon nanotubes (SWNTs or SWCNTs) and/or multi-walled carbon nanotubes (MWNTs or MWCNTs). Multi-walled carbon nanotubes generally have a diameter of about 10 nm and a length of about 2 µm. Single-walled carbon nanotubes generally have a diameter of about 2 nm and a length of about 5 µm.

The filling level of carbon nanotubes in the web may be, for example, about 3.5% by weight.

A web can for example be made from granules (masterbatch) in which carbon nanotubes are present. These granules will form the web by extrusion of filaments that become interlinked at the die exit.

The fibrous preform 300 is then densified with a matrix.

The densification of the fibrous preform consists in filling the void of the preform, in all or part of its volume, with the material constituting the matrix.

The matrix can be obtained in a manner known per se by the liquid process.

The liquid process consists in impregnating the preform with a liquid composition containing an organic precursor of the matrix material. The organic precursor is usually in the form of a polymer, such as a resin, optionally diluted in a solvent. The fibrous preform is placed in a sealable mold with a housing having the shape of the final molded component. As shown in FIG. 7, the fibrous preform 300 is here placed between a plurality of counter-mold forming sectors 240 and the support forming mandrel 200, these elements having the outer shape and the inner shape of the casing to be produced, respectively. Next, the liquid matrix precursor, for example a resin, is injected into the entire casing to impregnate the entire fibrous portion of the preform.

Converting the precursor into an organic matrix, i.e., polymerizing it, is carried out by heat treatment, generally by heating the mold, after eliminating the optional solvent and cross-linking the polymer, the preform always being maintained in the mold having a shape corresponding to that of the component to be produced. The organic matrix can in particular be obtained from epoxy resins, such as, for example, the high-performance epoxy resin sold.

According to an aspect of the invention, densifying the fibrous preform can be carried out by the well-known resin transfer molding (RTM) process. In accordance with the RTM process, the fibrous preform is placed in a mold having the shape of the casing to be produced. A thermosetting resin is injected into the internal space defined between the mandrel 200 and the counter-molds 240. A pressure gradient is generally established in this internal space between the place where the resin is injected and the resin discharge orifices in order to control and optimize the impregnation of the preform by the resin.

The resin used can be, for example, an epoxy resin. Resins suitable for RTM processes are well known. They preferably have a low viscosity to facilitate their injection into the fibers. The choice of the temperature class and/or the chemical nature of the resin is determined according to the thermomechanical stresses to which the component must be subjected. Once the resin has been injected into the entire reinforcement, it is polymerized by heat treatment in accordance with the RTM process.

Upon heating for the resin-to-matrix heat treatment, the fusible material in the layer 150 melts. The carbon nanotubes 160 then come into contact with the resin and form a reinforcing bond at the interface between adjacent turns of the fibrous texture (FIG. 2).

After the resin has been injected and converted into a matrix, the component is demolded. Finally, the component is trimmed to remove excess resin and the chamfers are machined to obtain the housing 100 shown in FIGS. 1 and 2.

The fugitive material of the layer comprising the carbon nanotubes wound with the fibrous texture may be a material other than a fusible material. For example, the layer may be made of a material capable of dissolving in the presence of a solvent such as water. Any other material that is chemically compatible with the fibers and the matrix of the composite component and that can be removed before or during densification of the preform can be used to carry the carbon nanotubes.

The invention claimed is:

1. A process for manufacturing a cylindrical composite component comprising:
    producing a fibrous texture in the form of a strip by three-dimensional or multi-layer weaving,
    winding the fibrous texture on several superimposed lathes on a mandrel with a profile corresponding to that of the component to be manufactured so as to form a fibrous preform,
    densifying the fibrous preform with a matrix,
    wherein, when the fibrous texture is wound on the mandrel, a web comprising a fugitive material filled with carbon nanotubes is interposed between the adjacent turns of the fibrous texture.

2. The process as claimed in claim 1, wherein densifying the fibrous preform comprises impregnating the preform with a resin and converting the resin into a matrix by heat treatment, and wherein the web comprising a fugitive material filled with carbon nanotubes is a layer of a fusible material filled with carbon nanotubes, the fusible material having a melting temperature lower than the treatment temperature of the resin.

3. The process as claimed in claim 2, wherein the fusible material is a thermoplastic having a melting temperature below 150° C.

4. The process as claimed in claim 2, wherein the carbon nanotubes are multi-walled carbon nanotubes having a diameter of 10 nm and a length of 2 µm.

5. The process as claimed in claim 2, wherein the carbon nanotubes are single-walled carbon nanotubes having substantially a diameter of 2 nm and a length of 5 µm.

* * * * *